(No Model.)
T. RAEKE.
FAT CUTTER.
No. 319,316. Patented June 2, 1885.
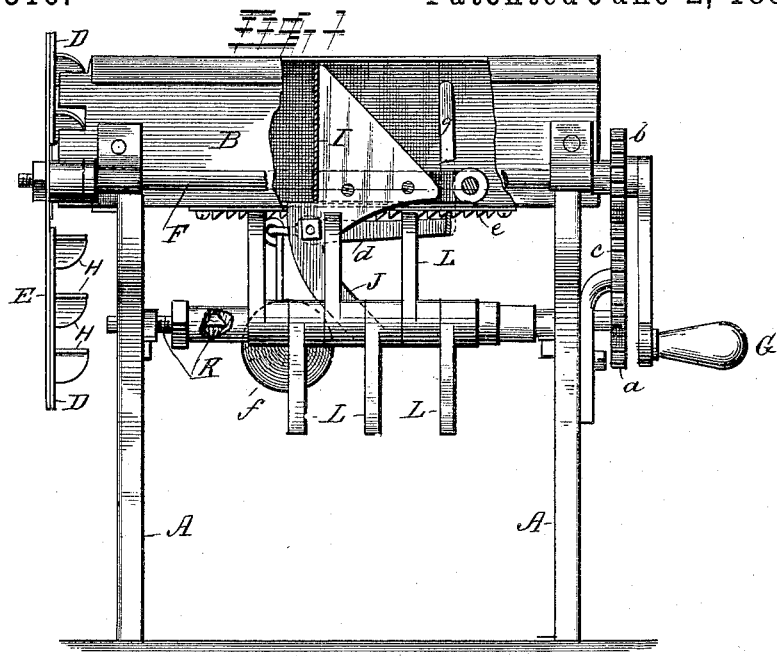
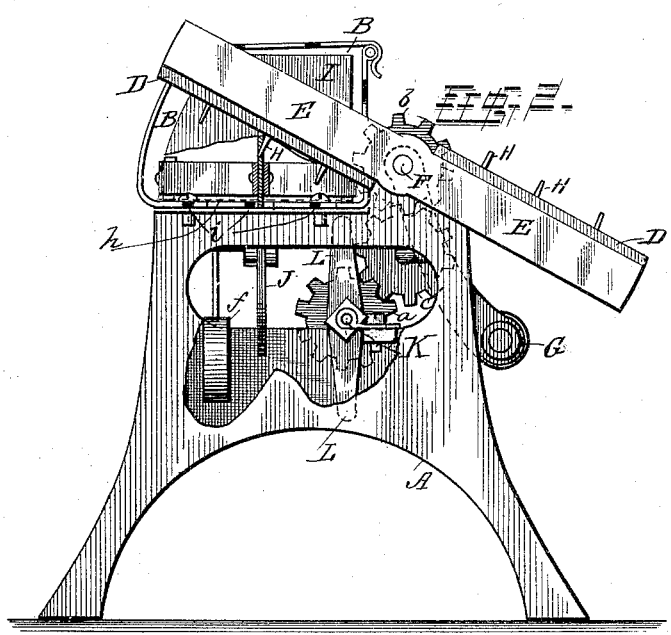
WITNESSES:
Fred. G. Dieterich
W. X. Stevens.
INVENTOR:
Theo. Raeke
BY Munn & Co.
ATTORNEYS.

UNITED STATES PATENT OFFICE.

THEODORE RAEKE, OF BALTIMORE, MARYLAND.

FAT-CUTTER.

SPECIFICATION forming part of Letters Patent No. 319,316, dated June 2, 1885.

Application filed March 26, 1884. (No model.)

*To all whom it may concern:*

Be it known that I, THEODORE RAEKE, a citizen of the United States, residing at Baltimore, Maryland, have invented certain new and useful Improvements in Fat-Cutters, of which the following is a description.

The object of this invention is to cut the fat of animals into small lumps of a size suitable to be readily reduced and separated by any suitable heating process; and it consists in the construction and combination of parts forming a fat-cutter, hereinafter described and claimed, reference being had to the accompanying drawings, in which—

Figure 1 is a front elevation, part in section, of my machine; and Fig. 2 is an end view, part broken away, of the same.

A represents the two end legs or frame of the machine. B is a trough fixed thereon to receive the fat to be cut.

D D are two blades, each sharp at one edge and secured by screws to a revolving head, E. This head is mounted rigidly on a shaft, F, which is journaled in the frame A, and is revolved by a hand-crank, G.

H represents a series of blades secured to project laterally from the plane of rotation of the blades D, to slit into the end of the fat.

I is the carriage, which is actuated to push the fat a given distance in front of the blades at each half-revolution of the latter, by which means the fat is cut into lumps equal in length to the amount of each feed motion of the carriage I, equal in width to the spaces between the lateral blades H, and equal in height to the thickness of the piece of fat being cut.

The feed motion is as follows: The carriage I is provided with an arm, J, projecting downward through a longitudinal slot in the bottom of the trough B and slanted backward, as shown. K is a square shaft journaled in the frame A and provided with removable arms L, which project alternately in opposite directions. At each half-revolution of the shaft K one of the arms L impinges against the rear side of arm J and forces it forward, carrying with it the carriage I by the wedging action of the slant of said arm J. The shaft K is provided with a toothed wheel, a, the same size as the toothed wheel b on shaft F, with which it is geared by means of an intermediate wheel, c, so that the carriage shall be fed at the time to push the fat between the blades D, rather than against them. The carriage is retained at each advance by means of a pawl, d, pivoted thereto to engage a rack, e, which is fixed on the under side of the trough. f is a weight hung at the opposite end of pawl d, to force it into said engagement. g is a handle of the pawl, projecting up through the slot into the trough behind the carriage. Whenever the arms L do not engage arm J, the carriage may be slid back by hand after pressing down the handle g to disengage the retaining-pawl.

The bottom and one or both sides of the front end of the trough will be provided with steel plates or blades h, notched at e' to permit the blades H to pass through. The notches in the blade h, allowing the lateral blades H to pass through, permit the blade h to project between blades H close to the plane of the blades D and support the end of the fat while being cut by both blades. Otherwise the blade D could have no shearing action, but would have to strike the fat quick enough to chop it off while projecting far from any support. This would be impracticable with soft or warm fat. Therefore I have provided the notched blade h to support the fat close to blade D and between blades H.

The rear or wearing edge of the arm J is plated with steel. The intermediate wheel, c, is needed to cause the two shafts to revolve the same way, so that the blades may strike down upon the fat and the arms L may strike down upon the inclined arm J.

What I claim as my invention, and wish to secure by Letters Patent, is—

1. The combination, with the slotted trough B, the head E, and the blades thereon, of the carriage I, fitted to slide in the trough, the arm J, secured rigidly to the carriage I and projecting downward and rearward through the said slot in the trough, the shaft K, and a series of radial arms, L, secured thereon to engage the slanting arm J successively, as and for the purpose specified.

2. The combination, with the slotted trough B, the carriage I, having the slanting arm J, the shaft K, and arms L thereon, of the pawl d, pivoted to the carriage and provided with a weight, f, the rack e, secured to the trough, and the handle g of pawl d, projecting into the trough, as shown and described.

3. The combination, with the slotted trough B, the frame A, the head E, and the blades thereon, of the shaft F, the toothed wheel b and crank G thereon, the shaft K, the arms L and toothed wheel a thereon, the intermediate wheel, c, the carriage I, having the slanting arm J, the pawl d, and rack e, as and for the purpose specified.

The above specification of my invention signed by me in the presence of two subscribing witnesses.

THEODORE RAEKE.

Witnesses:
    W. X. STEVENS,
    FRIEDRICH S. DEICHMILLER.